Patented Sept. 13, 1932

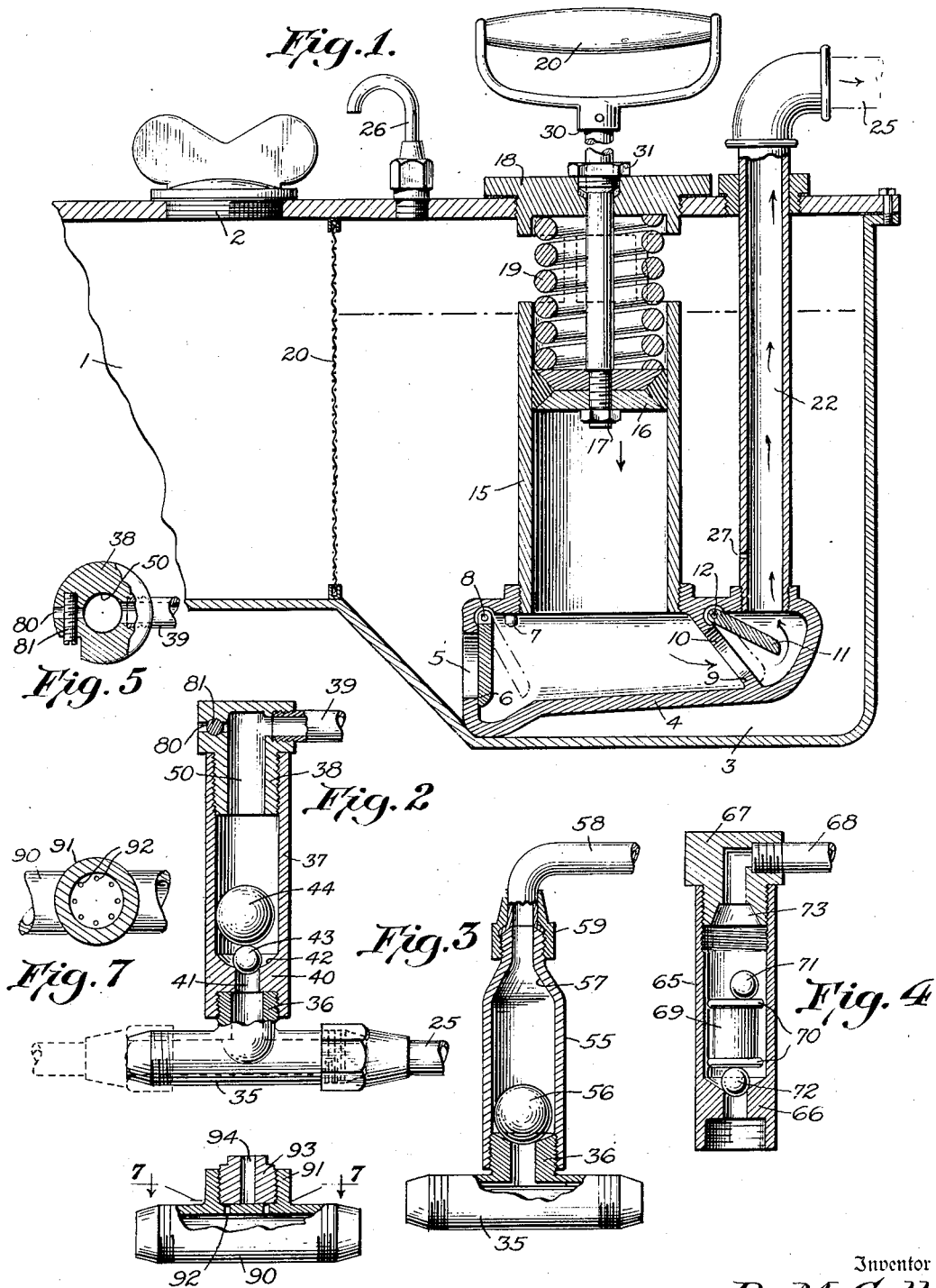

1,877,124

UNITED STATES PATENT OFFICE

RICHARD M. CUTTS, OF WASHINGTON, DISTRICT OF COLUMBIA

LUBRICATING SYSTEM

Application filed February 2, 1928. Serial No. 251,396.

This invention relates to lubricating systems and more particularly those employing force feed, having for its object to provide a system more simple in operation and efficient in use than those heretofore proposed.

With these and other objects in view the invention consists in the novel details of construction and combinations of parts as will be more fully hereinafter disclosed and particularly pointed out in the claims.

Referring to the accompanying drawing forming a part of this specification in which like numerals designate like parts in all the views;

Fig. 1 is a vertical sectional view of a means for forcing the lubricant through this system;

Fig. 2 is a detail view partly in section of one of the valves for supplying a measured quantity of lubricant to a bearing;

Fig. 3 is a view similar to Fig. 2 illustrating a slightly modified form of the valve;

Fig. 4 is a still further modified form of the valve;

Fig. 5 is a detail view of the upper portion of the valve illustrated in Fig. 2;

Fig. 6 is a view partly in section illustrating a means of filling the system on the delivery side of the valve; and Fig. 7 is a horizontal sectional view taken as on the line 7—7 of Fig. 6 and looking in the direction of the arrows.

In order that this invention may be the more properly understood it is said that heretofore there have been provided systems for lubricating bearings of machines including automobiles, but in so far as is known no positive means has been developed whereby a predetermined and measured quantity of lubricant has been supplied to each bearing, so that a definite quantity is permitted to flow to a certain bearing, and a more or less quantity is permitted to flow to another bearing requiring more or less lubricant than said first mentioned bearing. Many of the lubricating systems contain parts which tend to restrict the flow of lubricant rather than to permit a free flow thereof, and among these are devices in which there is employed screening or gauze or other filtering mediums which become clogged, with resultant impairment of the bearings. A system has been proposed which was intended to deliver measured quantities of lubricant to each bearing, but the parts are intricate thereby increasing the cost of manufacture prohibitively, and there exists such resistance due to friction of the moving parts that excessive pressure is required to force the lubricant to the bearings. Further, said system has such a construction that the pressure on the lubricant is variable due to air pockets, with the obvious result that the measure of lubricant is unreliable. As contradistinguished from such devices, this invention contemplates the employment of simple inexpensive and standard parts, a minimum of resistance to the lubricant, elimination of air, and therefore an efficient operation of the system under low pressure. In fact this invention contemplates substantially frictionless moving parts whereby the parts are readily movable from one position to another through the lubricant as well as by the flow thereof.

Any simple means may be employed for putting the lubricant under pressure, such as the pump illustrated in Fig. 1. This pump comprises a receptacle generally indicated by the numeral 1 for receiving the lubricant through the filler opening 2 in the top thereof. This receptacle is provided with a depending portion 3 into which is fitted a substantially cylindrical member 4 provided at one end with an opening 5 adapted to be closed by a flap valve 6 whose movement in one direction is limited as by a stop 7, said valve freely hinged to said member 4 as at 8. Near the other end of the cylinder 4 there is provided a partition 9 having the opening 10 therein which is adapted to be closed by a second flap valve 11 hinged as at 12. In the upper portion of one side of the chamber 4 there is disposed an upwardly extending cylinder 15 adapted to receive the piston 16 provided with suitable packing and carried at the lower extremity of the rod 17 passing upwardly through the threaded gasketed plug 18 in the top of the oil receptacle 1. Between the undersurface of said plug and the piston 16 is disposed a relatively strong compression spring 19 so that when the piston 16 is moved upwardly in its cylinder, through the medium of the handle 20 secured to the upper end of the rod 17, the spring will be compressed and when the handle is released the piston will be forced downwardly, all as will be readily understood. A screen 20 may be provided between the filler opening 2 and the valve chamber 4 to filter the lubricant passing to the latter.

Also disposed in the upper portion of the cylindrical chamber 4 is the pipe 22 extending out through the top of the receptacle 1 and connecting with what will be termed the main line conduit 25 for leading the lubricant to the parts desired. A suitable air vent 26 is located in the top wall of the receptacle 1 for maintaining atmospheric pressure on the lubricant within the receptacle.

From the foregoing it will be evident that when the handle 20 is pulled in an upward direction, the piston 16 will cause the lubricant within the receptacle to pass through the opening 5 with its associated valve 6 and enter the cylinder 15, the valve 11 during this operation becoming seated as indicated by its dotted line position so that lubricant within the pipe 22 will not be drawn downwardly. When the handle 20 is released, the spring 19 under compression will force the piston 16 downwardly whereupon the valve 6 will seat as shown in full lines, but the lubricant within the cylinder 15 (which is more than sufficient to serve all the bearings) will be caused to pass the valve 11 and move upwardly through the pipe 22 as indicated by the arrows. The movement of the lubricant as thus described will continue until all of the bearings associated with this system have received their measured quantity of lubricant. When this has been accomplished then the remaining oil under pressure within the cylinder 15 and pipe 22 will be relieved of said pressure due to the bleeder hole 27 in the pipe 22. The spring 19 is made long and strong enough so that when the piston 16 is in its uppermost position there will be placed thereon a pressure and for a time sufficient to lubricate all of the bearings, and by providing the shoulder 30 adjacent the handle 20, the lower limit of movement of the piston is regulated. In other words, the piston 16 may travel downwardly until the shoulder 30 comes to rest against the packing gland nut 31 at which time there will still be a considerable pressure remaining in the spring 19. These pressures may vary with conditions of temperature and quality of lubricant, the important feature being to provide pressure adequately high to force the lubricant to and through the bearings. In other words, it is an essential that the pressure on the lubricant at the end of the stroke of the piston is more than sufficient to have passed lubricant through all the bearings.

At suitable intervals in the main line 25 are provided T's 35 of any suitable type and to said T's are secured the valves for controlling the flow of lubricant to the bearings. In other words, to the upstanding branch 36 of each T there is screwed the valve casing 37, and to the top of said casing is threaded a measuring plug 38 connecting with a discharge conduit 39 leading to the bearing. The casing 37 in its preferred form is substantially cylindrical throughout its length, being internally reduced at its lowermost end as indicated at 40 to provide the relatively small passage 41 in open communication with the main line for passage of the lubricant to the interior of the valve casing. The inner surface of the portion 40 of the valve casing is bevelled as indicated at 42 to provide a positive means for directing the ball 43 to its seat to close the passage 41. Within the casing 37 and above the ball 43 there is a second and larger ball 44 whose diameter is just slightly less than the internal diameter of the cylindrical casing, so that the ball 44 may freely move upwardly and downwardly within said casing and within the lubricant. Both balls 43 and 44 may be standardized members suitable for bearings and therefore easily and cheaply procured, the size of the larger ball being of about one-half inch diameter.

The plug 38 is threaded into the valve casing 37, the threaded portion of said plug being of a predetermined length, according to the bearing to be lubricated. That is to say, a bearing requiring but a small quantity of lubricant will be controlled by a valve, into the casing of which a plug will be fitted having a relatively long threaded portion so that the travel of the ball 44 will be relatively short. On the other hand, if the bearing requires a relatively large amount of lubricant, the valve casing will be fitted with a plug having a much shorter threaded portion than was the case just above described, as a result of which the ball 44 will have a longer travel. The plug 38 is internally provided with a bore 50 the end of which is adapted to be closed by the ball 44.

From the foregoing it will now be evident that lubricant will be forced from the main reservoir 1 by the piston 16 into the main line 25, through the T 35 through the passage 41 into the interior of the valve casing 37, the balls 43 and 44 moving upwardly by action of the flow of the lubricant until the upper ball 44 reaches the plug 38, becomes seated in the end of the passage 50, and cuts off the flow of lubricant through the valve. When this occurs pressure will still be on the lubricant below the ball 44 due to the fact that the piston 16 will be functioning under the action of the spring 19. This hydrostatic pressure will not be released until the said piston has reached the limit of its downward travel with the result that the ball 44 will remain seated against the plug 38 so long as there exists said hydrostatic pressure, but the smaller and lower ball 43 will immediately fall, after the seating of ball 44, under the action of gravity, down through the lubricant within the cylinder 37 and again be seated in the position shown in Fig. 2. When the pressure on the lubricant in the main line is reduced to equal the pressure above the ball 44, then said ball will drop under the action of gravity and come to rest on the lower ball 43 as shown in Fig. 2. In other words, it has been demonstrated that the weight of the steel ball 44 is not sufficient to cause it to leave its seat so long as there is pressure in the main line sufficient to extrude lubricant through the discharge pipe 39. The smaller ball 43 serves as a trap for preventing a return to the main line, after the release of pressure therein and in the casing 37, of any lubricant that has entered said valve casing, as will be understood.

When it is next desired to lubricate the bearings, the piston 16 will again be actuated to put pressure on the lubricant on the main line 25. When this occurs both balls 43 and 44 will again be forced upwardly by said lubricant under pressure and in this movement all lubricant above the ball 44 will be forced out of the casing 37 through the plug 38 and conduit 39 to the bearing. The reason for this is that the ball 44 is but very slightly less in diameter than the internal diameter of the valve casing 37 so that when the pressure is on the main line, there will be equal pressure on the lubricant within the casing 37 both below and above the ball 44. In other words, the ball and all of the lubricant within the said casing will move as a unified body toward the delivery or outlet conduit 39. This may be stated in other words as follows: there will be so much skin friction offered by the exterior surface of the ball 44 and the relatively small passage afforded between said ball and the inner surface of said casing, that practically none of the lubricant below said ball will pass around said ball to reach the portion of the casing thereabove, but said lubricant will on the other hand create such pressure as will cause the ball to move along with the lubricant. Therefore, the amount of lubricant above the ball 44 when said ball is in its lowermost position, will be the quantity of lubricant that is permitted to reach the bearing at any one time, said amount of lubricant moving by a step-by-step process toward and through the bearing as will be readily understood. In this manner, and according to the length of the threaded portion of the plug 38, each bearing will receive a definite or predetermined and measured quantity of lubricant each time that pressure is applied to the lubricant in the main line 25. The passage between the ball 44 and the inner wall of the casing 37 is very small and while there may be permitted a seepage of lubricant past the ball while the same is moving upwardly in the valve casing, yet said seepage will be minute, and further the seepage for each upward travel of the ball will be a constant amount so that as a result this negligible seepage may be positively considered in connection with the measured quantity of lubricant for any one bearing.

It is to be particularly noted in the embodiment of the valve illustrated in Figure 2 that, by utilizing a round ball 44, there is produced point contact between the surface of the ball and the inner surface of the casing due to the difference in diameters thereof. Thus it is impossible for the ball to become stuck or cocked in the casing, whereby there is insured positive movement of said ball. Also it should be observed that the seats for both balls 43 and 44 are so formed as to create substantially line contact between said seats and said balls. In other words, the actual seat for each of these balls is a substantially square or sharp corner of circular formation so that each ball may properly seat and, when seated, have a minimum of surface contact (line contact) so that the balls will not stick, due to the viscosity of the lubricant, to their seats, but will be free to move away therefrom readily.

Referring now more particularly to Figure 3 there is disclosed the same T. 35, adapted to be fitted in the main line, but secured to the extension 36 thereof is a casing 55 somewhat different in design from the casing 37. The casing 55 is, in a manner, a reversal of the casing 37 in that the reduced portion of said casing is uppermost. With this modified casing there is required but one ball 56 which is adapted on the upward movement thereof to become seated in the constricted portion 57 of the casing, or on an internal shoulder formed therein but not shown, to shut off the flow of lubricant. When the pressure is reduced on the system the ball 56 will fall under the action of gravity and become seated in the cupped end of the extension 36 of the T 35 all as clearly indicated in the drawing. The usual tubular piping 58 may be employed for carrying the discharged lubricant to the bearing, the end of the tubing being flared and secured to the casing 55 as by the usual coupling 59. With this type of valve the predetermined or measured quantity of lubricant is determined by the length of the casing 55. The chief advantage of a valve of this modified form is that it may be used for extra heavy lubricants such for example as what is known on the market as 600-W, or oils which are much heavier than those for which the valve illustrated in Figure 2 is chiefly adapted.

It is to be particularly noted that only one ball is illustrated in the valve shown in Fig. 3 whereas there are two balls shown in the valve illustrated in Fig. 2. The former valve, as stated above, is particularly adapted for extra heavy oils or in other words oils having a very high viscosity so that when the ball 56 is in the uppermost portion of the valve casing and the pressure on the main line is taken off, the ball 56 will start to drop. It would seem that the falling ball would create a pressure that would tend to force the lubricant therebelow back into the main line, but it has been found that this is not the case, the viscosity of the heavy oil and the narrow confines of the main line and the size of the bleeder opening 27 shown in Fig. 1 offering a resistance greater than this small pressure. Therefore the said ball 56 will slowly fall through the lubricant displacing the same from below to above the ball. The valve shown in Fig. 2 is adapted for a lighter grade of oil and therefor it has been found advisable to provide the smaller ball 43 which becomes seated, after the ball 44 has checked the flow of oil through the valve, so that when the pressure is taken off the main line and the larger ball falls, the ball 43 will prevent a forcing of the lubricant from the valve casing 37 back into the main line. It can be readily understood that were the balls 44 and 56 permitted to force lubricant back through the main line, and bleeder opening 27 into the reservoir 1 there would be created an air pocket, either in the valve or between the valve and the bearing, which would not only affect the pressure placed on the lubricant by the pump but would cause a change in the predetermined and measured quantity of lubricant forced to the bearing.

Coming now to Figure 4 there is disclosed another modified form of valve which is better suited for light oils. This valve comprises the casing 65 which is internally restricted as at 66 in the lower extremity thereof and provided internally with the threads by which the casing is secured to the T, not shown, in a manner similar to the valve in Figure 2. The other and internal end of the casing is likewise threaded through a considerable distance for receiving the plug 67 which is substantially similar to the plug 38 hereinbefore described and having associated therewith the discharge conduit 68. Within the casing there is provided a plunger 69 of substantially cylindrical shape throughout its main body portion but which is provided at each end with an enlarged arcurately formed rim portion such as indicated at 70 to insure point contact with the surface of the casing 65. The diameter of these rims 70 is greater than the diameter of the main body portion of the plunger but less than the internal diameter of the casing 65. There is provided a relatively small ball 71 above the plunger and also a relatively small ball 72 below said plunger each adapted to become seated to prevent passage of lubricant out of the casing 65 when not desired. In other words, when the lubricant under pressure enters the casing from the main line it will force the plunger 69 upwardly and said plunger will carry the ball 71 up into the recessed end 73 of the plug 67, where said ball will become seated on the sharp shoulder clearly indicated in the drawing. The end of said plug is internally bevelled as shown to cause a positive seating of the ball 71 to stop the passage of lubricant from the casing to the discharge pipe 68. As soon as the ball 71 becomes so seated, the ball 72 will become firmly seated at the other end of the casing, and, when the pressure on the main line has fallen as above described, the plunger 69 will slowly pass downwardly under the action of gravity, and, there being no pressure on the underside of the ball 71 to keep it in its seat, said ball will come downwardly along with the plunger. These downward movements will continue until the plunger comes to rest on the seated lower ball 72. The parts are then ready for the next application of pressure when the lubricant will force the plunger 69 upwards. The surfaces of both ends of the plunger are made preferably flat to insure a freer movement of the balls in contact therewith and further to provide a point contact between each ball and the plunger. The same principle of operation exists in this modification as was described above in connection with the valve shown in Figure 2 namely, too little space is created between the rims of the plunger 69 and the inner surface of the casing 65 to permit an appreciable seepage of lubricant past said rims under pressure, but said space is made sufficiently large to prevent a sticking of the plunger in the casing due to the viscosity of the lubricant. As a result, it has been found that the lubricant under pressure will positively force the plunger upwardly and, when the pressure has subsided, the plunger may move downwardly under the action of gravity through the lubricant in the casing 65.

It may become necessary at times to disconnect the connection of the discharge conduits from the bearings as when repairs to the latter may become necessary. When this occurs it is evident that the discharge conduit, from its valve to its bearing, may lose the lubricant therein with the result that when the connection is remade lubricant would again reach the bearing only after some appreciable time interval which in turn might cause serious damage to the bearing inasmuch as the application of pressure on the lubricant in the main line, with such a system as herein disclosed, need only be made after each five hundred or more miles of travel of the vehicle. Therefore means are here provided for refilling the discharge conduit so that upon the next application of pressure, the lubricant will reach and enter the bearings.

This means is illustrated in Figures 2 and 5 as comprising a bore 80 in the plug 38, said bore preferably in axial alignment with the discharge conduit 39. This bore extends entirely through the wall of the plug and is adapted to be crossed by a threaded tap 81 of slightly larger diameter than the diameter of said bore. Thus it will be seen that after the repair or replacement of the bearing has been effected and the discharge conduit 39 reconnected to the bearing, the tap 81 may be partially backed out of its threaded engagement with the plug 38 so that lubricant may be forced under pressure through the bore 80 to replace the lubricant lost while the repair was being made. This lubricant under pressure is continually fed until the lubricant is seen to extrude from the bearing at which time the tap 81 is screwed into tight engagement to close the bore 80.

Another means is disclosed in Figures 6 and 7 wherein there is provided a special T 90 provided with the usual lateral extension 91 in the bottom of which is provided a circular row of small apertures 92 joining the main passageway of the T. Threaded into the extension 91 is a plug 93 having a central bore 94 no part of which will register with any of the apertures 92. Thus it will be seen that when the plug is screwed tightly into the extension 91, the bottom surface of said plug will cover the circular row of apertures 92 and prevent the passage of any lubricant therethrough, but when the plug is screwed away from this position there will be provided a space between the end of the plug and the web in which are located the apertures 92, so that lubricant under pressure can be forced through the bore 94 through the apertures 92 into the T 90 and into the discharge conduit 39 associated with the T to replace the lost lubricant. Stated in other words, when the repair is to be made, the discharge conduit is cut and after the repair is completed this special T 90 is inserted between the cut ends of the discharge conduit and lubricant applied through the plug 93 as just stated. When the lubricant is seen to extrude through the bearing then the plug 93 is screwed tightly into place to close the apertures 92 and the source of lubricant under pressure removed, such as the so-called alemite-gun.

Many advantages will be seen to reside in the constructions hereinbefore described, but a few of the chief ones should be particularly mentioned. There are no air pockets formed in this system as the lubricant has a continuous and direct flow from the source to the bearing. The hydrostatic pressure at the outlet is the same as at the inlet of the metering valve except for slight friction loss which in all probability would not exceed that in a piece of pipe of the same length. There are no springs and no packing, the pressure and friction of which must be overcome by increased and additional pressure placed on the lubricant at its source. Each valve is hydrostatic and gravity operated only or in other words the movable member within the casing, which may be likened to a floating piston and which separates the predetermined quantity of the lubricant for the bearing from the rest of the lubricant in the duct line, is moved only by the force of the fluid pressure existing in the duct line to force the predetermined quantity to the adjacent bearing, and then said movable member is returned through the lubricant to its inoperative position by the constant force of gravity after the fluid pressure of the system has been exhausted.

It will be seen that the valve casing is in open communication at one end with the main supply line and in the preferred form of the invention there is provided an apertured plug which is adapted to engage the other end of said casing for such a distance as will provide a measuring chamber in the casing of a capacity for the amount of oil required for the particular bearing associated with the valve. In this case the casings are all made of a uniform size and internally threaded at one end for the same distance so that each casing may receive a plug having a depending threaded portion of such a length as will provide a free space within the casing for an amount of lubricant requisite to the bearing for which the plug was designed, said space constituting the measuring chamber. This form may be reversed by varying the length of the casing while keeping constant the length of the plug, all as will be obvious. The metering chamber is filled during the period of highest pressure on the line, and is on the side of the plunger or ball opposite the source of supply. There is no opposing pressure on the discharge side of the valve other than the resistance offered by the lubricant passing through the bearing. No residual pressure is left on the line as the bleeder opening 27 permits the escape of pressure on said line after the last bearing has been lubricated. Further, it is to be particularly observed that the time element for operation of this system is made sufficiently long due to the capacity of the pump and the size of the bleeder hole 27 to positively insure an obstructed bearing receiving the predetermined measured quantity of lubricant therefore. In other words, the parts are so designed and dimensioned that pressure will remain on the main line for a period of time far in excess of that required for a normal feed of lubricant to and through any one bearing. Notwithstanding the operation of valves between the one nearest to and the one farthest from the pump, resulting in progressive diminution of pressure on the main line, there still remains enough power and reserve capacity in the pump to operate the farthest valve due to the fact that the intermediate valves successively cease to draw lubricant from the main line after they have functioned, whereupon the full capacity of the main line passes to the end valve. By having small variations between elevations of reservoir and bearings syphoning of the lubricant in either direction through the main line does not exist due to the balls by their weight overcoming attempted flow in one direction and the seating of the balls serving as a positive check to flow in the opposite direction.

It is obvious that those skilled in the art may vary the details of construction as well as arrangements of parts without departing from the spirit of the invention and it is therefore not desired to be limited to the foregoing disclosure except as required by the claims.

What is claimed is:

1. In a lubricating system, a valve for a bearing comprising a casing provided with openings constituting an inlet and an outlet, and in communication with the main supply line; an apertured plug engaging one of said openings for a distance to provide a chamber in said casing to hold a predetermined amount of lubricant; and means singly responsive to the hydrostatic pressures in said system to close the outlet opening when each predetermined amount has passed therethrough, said means being reversely moved by the urge of gravity when said pressures have been removed and said means constituting a separator between the main supply and each predetermined amount of lubricant.

2. In a lubricating system, a valve for a bearing comprising a casing provided with openings constituting an inlet and an outlet, and in communication with the main supply line; an apertured plug engaging one of said openings for a distance to provide a chamber in said casing to hold a predetermined amount of lubricant; and means comprising a floating piston solely responsive to the hydrostatic pressures in said system to close the outlet opening when each predetermined amount has passed therethrough, said means being reversely moved by the urge of gravity when said pressures have been removed and said means constituting a separator between the main supply and each predetermined amount of lubricant.

3. In a lubricating system, a valve for a bearing comprising a casing provided with openings constituting an inlet and an outlet, and in communication with the main supply line; to receive the lubricant under flow; an apertured plug engaging one of said openings for a distance to provide a chamber in said casing to hold a predetermined amount of lubricant; and floating means separated from the walls of said chamber by a viscous film of said lubricant substantially incapable of transmitting the flow said means singly responsive to the hydrostatic pressures in said system to close the outlet opening when each predetermined amount has passed therethrough, said means being reversely moved by the urge of gravity when said pressures have been removed and said means constituting a separator between the main supply and each predetermined amount of lubricant.

4. In a lubricating system, a valve for a bearing comprising a casing provided with openings constituting an inlet and an outlet, and in communication with the main supply line; to receive the lubricant under flow; an apertured plug engaging one of said openings for a distance to provide a chamber in said casing to hold a predetermined amount of lubricant; and means comprising a ball closely fitting the walls of said chamber, with a film of said lubricant therebetween substantially incapable of transmitting the flow, whereby said ball is solely responsive to the hydrostatic pressures in said system to close the outlet opening when each predetermined amount has passed therethrough, said ball being reversely moved by the urge of gravity when said pressures have been removed and said means constituting a separator between the main supply and each predetermined amount of lubricant.

5. In a lubrication system for bearings a reservoir for the lubricant and means therein for establishing a hydrostatic pressure, connections providing a duct from the reservoir to a bearing said connections including a chamber to hold a predetermined amount of lubricant, and a feeding means within said chamber said means comprising a device responsive to said hydrostatic pressure to pass to each bearing said predetermined amount of lubricant, said device being returned to inoperative position by the urge of gravity when said pressure has been removed and said means constituting a separator between the main supply and each predetermined amount of lubricant.

6. In a force feed lubricating system for bearings a measuring valve for a bearing said valve having a lubricant separating member therein responsive to the fluid pressure in said system for movement in one direction and solely responsive to the attraction of gravity during the return, said member on the return movement passing through the lubricant to separate therefrom a portion to be subsequently fed to the bearing.

7. In a lubricating system including a main supply line, a valve for a bearing comprising a casing provided with openings constituting an inlet and an outlet, and in communication with the main supply line to receive the lubricant under flow; an apertured plug engaging one of said openings for a distance to provide a chamber in said casing to hold a predetermined amount of lubricant; and means comprising a floating piston within said chamber and having a specific gravity with respect to the lubricant such that hydrostatic pressures will be transmitted around said means and no flow of lubricant will result around said means when said lubricant is flowing toward said outlet, said means to close the outlet opening when each predetermined amount has passed therethrough, said means being reversely moved by the urge of gravity when said pressures have been removed, and said means constituting a separator between the main supply and each predetermined amount of lubricant.

8. A force feed lubricating system for a bearing controlled by a valve comprising a floating piston and a casing therefor adapted to vary the permissive movement of said piston said piston adapted to travel with the lubricant under pressure to one limit of said casing and to be returned to the other limit of said casing solely by the attraction of gravity.

9. A force feed lubricating system for a bearing controlled by a valve comprising a lubricant separating member and a casing therefor adapted to vary the permissive movement of said member said member adapted to travel with the lubricant under pressure within the limits of said casing, and to be returned solely by the attraction of gravity through said lubricant after the pressure in the system has been reduced to that of the atmosphere.

10. A valve for a bearing in a lubricating system the same comprising a casing in open communication at one end with the main supply line; an apertured plug adapted to engage the other end of said casing for a distance to provide a measuring chamber in said casing to hold the amount of lubricant necessary for said bearing; and a separating member in said casing moving with the lubricant through said measuring chamber, said member moved in one direction by the fluid pressure of lubricant and moved in the opposite direction solely by the attraction of gravity.

11. A valve for a bearing in a force feed lubricating system the same comprising a casing in open communication at one end with the main supply line and at the other end with said bearing, said casing adapted to constitute a measuring chamber to hold the amount of lubricant necessary for said bearing; and a separating member in said casing adapted for movement in one direction in accordance with the fluid pressure in said system and returned solely by the attraction of gravity.

12. In a lubricating system, a valve for a bearing comprising a casing provided with openings constituting an inlet and an outlet, and in communication with the main supply line; an apertured plug engaging one of said openings for a distance to provide a chamber in said casing to hold a predetermined amount of lubricant; and floating means fully responsive to the lubricant flow in said system to positively close the outlet opening when each predetermined amount opening has passed therethrough, said means being reversely moved solely by the urge of gravity when the pressure in the main supply line becomes atmospheric, and said means constituting a separator between the main supply and each predetermined amount of lubricant.

13. A system of lubrication including a reservoir for the lubricant, a valve chamber communicating with a bearing to be lubricated, a main supply duct for conveying lubricant under pressures from said reservoir to said chamber, and a member loosely fitting said chamber and movable from one end thereof to the other by the lubricant under flow said member offering a resistance to said flow equal solely to its weight in the lubricant, said member to control the amount of lubricant supplied to the bearing.

14. In a lubrication system including a bearing and a source of lubricant supply connected thereto under pressure, a measuring valve including a chamber having an inlet and an outlet at opposite ends thereof, and a member in said chamber movable in one direction by the lubricant flow and returned by a force substantially constant during said return, said member constituting means to separate a portion of said lubricant from said supply, as well as means to alternately close said inlet and said outlet at the limits of its travel.

15. In a lubricating system, a valve for a bearing comprising a chamber having an inlet port and an outlet port at opposite ends of said chamber, and a member within said chamber freely movable between said ports to alternately close the same at the limits of its travel, said member moved in one direction by the lubricant flow and in the opposite direction solely by the urge of gravity.

In testimony whereof I affix my signature.

RICHARD M. CUTTS.